UNITED STATES PATENT OFFICE.

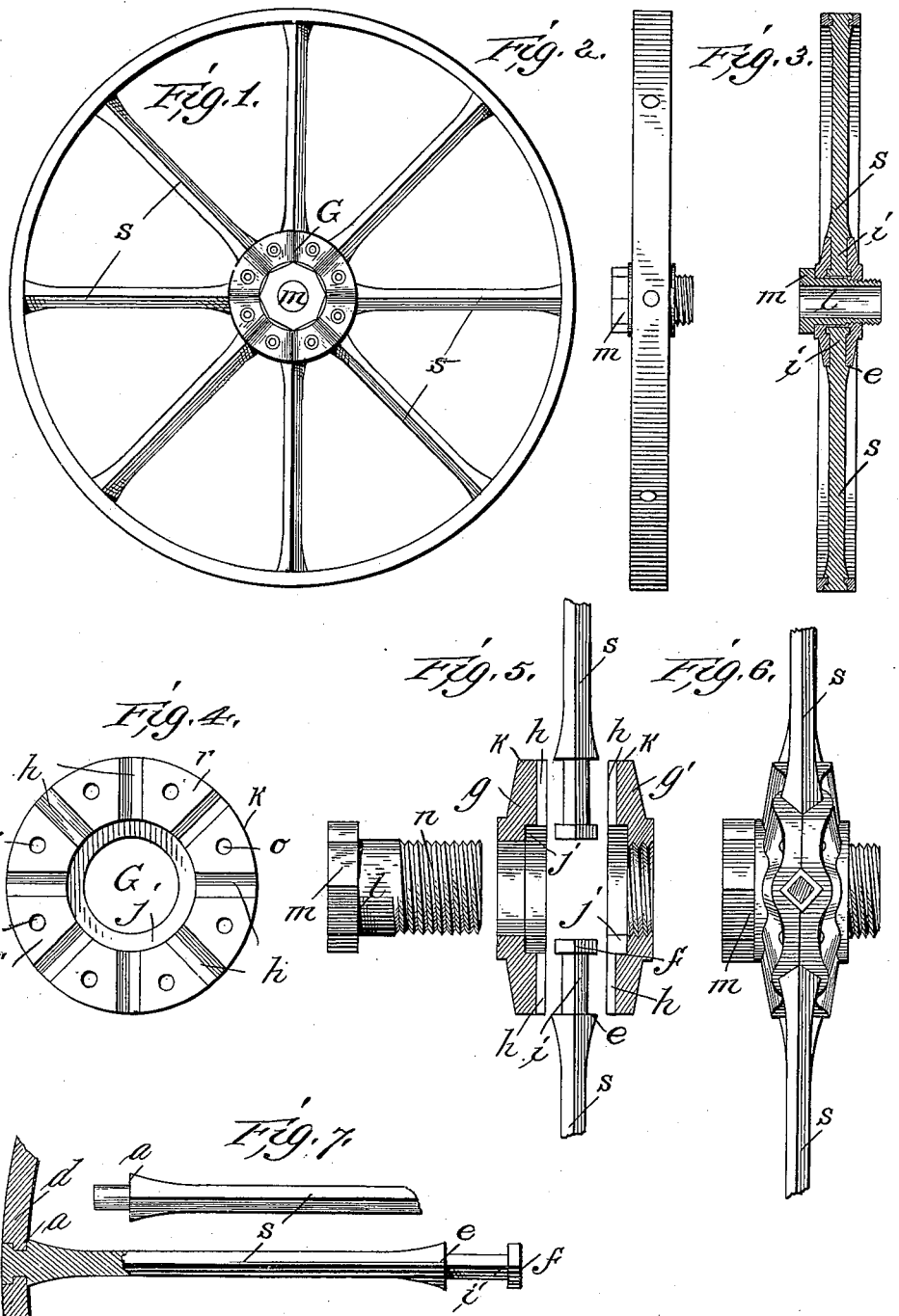

DAVID GOEKE AND AUGUST KNAACK, OF DAVENPORT, IOWA.

WHEEL.

SPECIFICATION forming part of Letters Patent No. 629,442, dated July 25, 1899.

Application filed December 15, 1898. Serial No. 699,352. (No model.)

*To all whom it may concern:*

Be it known that we, DAVID GOEKE and AUGUST KNAACK, citizens of the United States, and residents of Davenport, in the county of Scott and State of Iowa, have invented certain new and useful Improvements in Wheels, of which the following is a specification.

Our invention relates to wheels adapted to revolve on a shaft or axle and which have spokes radiating from a hub; and its object is to provide an improved hub, an improved spoke, improved means of attaching the spoke to the hub, and certain other improved parts and combinations of parts more specifically set forth hereinafter.

In the drawings accompanying and forming a part of this specification, Figure 1 is a side elevation of a wheel embodying our improvements. Fig. 2 is a rear elevation of the same. Fig. 3 is a vertical transverse section of Fig. 2. Fig. 4 is a detail view of a half-hub, showing its inner surface. Fig. 5 is a vertical cross-section of the hub, showing its halves somewhat separated and showing also the spoke and box. Fig. 6 is an enlarged view of the hub seen from the rear with rim and parts of spokes broken away. Fig. 7 is a detail view of a spoke.

Referring more specifically to the drawings, G denotes our improved hub, which is divided radially into the corresponding halves $g$ and $g'$, which when bolted or otherwise firmly held together constitute the hub and which are capable of being separated when occasion requires.

The hub is provided with recesses for the reception of the spokes, one half of each recess being in each half-hub.

The letters $h\ h$ denote the recessed portion of each half-hub. On the inner surface of the hub next the journal-box is the annular recess $j\ j$, connecting the recesses $h\ h$ at their inner ends, adapted to receive the spoke-heads and providing a square shoulder to hold the spoke firmly in place by its head. Each spoke $s$ has at its hub end a head $f$, adapted to fit into the recess $j\ j$ when in the hub. Next rimward from the spoke-head is a portion $i$ of the spoke, extending for the radial extent of the hub and adapted to fit snug in the recess $h$. The shoulder $e$ on the spoke comes flush against the outer surface $k$ of the hub, and the spoke tapers to its normal size toward the rim. It swells again near the rim, so as to provide the shoulder $a$ flush against the rim $d$, to which it is attached in any suitable manner.

$l$ is a journal-box adapted to receive the shaft or axle on which the wheel is to run. $m$ is a head or shoulder on the outer end of the box adapted to come snug against the hub. The box $l$ has its outer surface threaded ($n$ denoting the threads) up to a distance of about half the width of the hub from the head $m$. The outer half $g$ of the hub fits on the unthreaded portion of the box. The inner half-hub $g'$ is threaded, so as to screw onto the box. It is evident that the halves may be brought tightly together by turning the box in them. The portions $r\ r$ of the half-hubs $g\ g'$ being the parts between the recessed portions $h\ h$ may be made somewhat thinner, as shown, and are provided with bolt-holes $o\ o$, so that the half-hubs may be bolted firmly together.

The wheel is assembled by laying the spokes in place on one half-hub, as $g$, laying the other half upon them and bolting them firmly together. The box is then screwed in and the rim put on. It is evident that the wheel can be assembled by any unskilled operator using a common wrench. The box $l$ may be elongated, if desired, so as to be used as a shaft.

Having thus described our invention, what we claim as new, and desire to secure by Letters Patent, is—

1. In combination in a wheel, the rim, the two-part hub, each part having an annular recess in its opposing face with flat bottom walls and radial recesses leading therefrom and the spokes each having a head held in said annular recesses with flat sides adapted to bear squarely against said flat walls, a reduced portion contiguous to said head held in the radial recesses and shoulders overhanging said reduced portion bearing on the periphery of the hub, substantially as described.

2. In a wheel a hub G divided radially into the half-hubs $g$ and $g'$, said half-hub $g'$ being threaded on its axle-surface, said half-hubs having recesses $h, h$, and $j, j$, forming spoke-sockets when the halves are clamped together, spokes having each a head $f$ at the hub end and a shoulder $e$ bearing on the hub-surface, said spokes tapering toward the rim from the shoulder $e$, a journal-box $l$ having a head $m$ and screw-threads $n$, means for clamping and holding the half-hubs in position about the spokes, and a rim, all as set forth.

DAVID GOEKE.
AUGUST KNAACK.

Witnesses:
JOHN H. CLELAND,
HAROLD A. WELD.